(12) United States Patent
Pekarsky et al.

(10) Patent No.: US 9,365,091 B2
(45) Date of Patent: Jun. 14, 2016

(54) VEHICLE THERMAL MANAGEMENT AND FILTRATION SYSTEM

(71) Applicant: Ford Global Technologies, LLC, Dearborn, MI (US)

(72) Inventors: Lev Pekarsky, West Bloomfield, MI (US); David Fabricatore, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 381 days.

(21) Appl. No.: 13/757,386

(22) Filed: Feb. 1, 2013

(65) Prior Publication Data

US 2014/0216693 A1   Aug. 7, 2014

(51) Int. Cl.
| | |
|---|---|
| *H01M 10/50* | (2006.01) |
| *B60H 1/00* | (2006.01) |
| *H01M 10/663* | (2014.01) |
| *H01M 10/66* | (2014.01) |
| *B60H 1/14* | (2006.01) |
| *H01M 10/625* | (2014.01) |
| *H01M 10/6557* | (2014.01) |
| *H01M 10/6567* | (2014.01) |

(52) U.S. Cl.
CPC ........ *B60H 1/00278* (2013.01); *B60H 1/00392* (2013.01); *B60H 1/143* (2013.01); *H01M 10/5093* (2013.01); *H01M 10/5095* (2013.01); *H01M 10/625* (2015.04); *H01M 10/6557* (2015.04); *H01M 10/6567* (2015.04); *B60H 2001/00307* (2013.01)

(58) Field of Classification Search
CPC ............... H01M 10/5093; H01M 10/5095; H01M 10/5097; H01M 2220/20; H01M 10/625
See application file for complete search history.

(56) References Cited

U.S. PATENT DOCUMENTS

| | | | | | |
|---|---|---|---|---|---|
| 4,506,513 | A | * | 3/1985 | Max ..................... | F25B 47/022 55/434.4 |
| 5,529,114 | A | * | 6/1996 | Hall ....................... | F01P 7/164 165/104.33 |
| 6,080,060 | A | * | 6/2000 | Larsson ................. | F24F 3/161 454/187 |
| 6,806,328 | B2 | * | 10/2004 | Holtcamp ............. | C08F 210/16 502/103 |
| 8,973,386 | B2 | * | 3/2015 | Favaretto ............... | B60K 11/02 180/65.1 |
| 2002/0064582 | A1 | * | 5/2002 | Carabetta ........... | A21D 13/0025 426/112 |

(Continued)

FOREIGN PATENT DOCUMENTS

| | | |
|---|---|---|
| JP | 2011162152 A | 8/2011 |
| WO | 2010139582 A1 | 12/2010 |
| WO | 2012040022 A2 | 3/2012 |

*Primary Examiner* — Scott J Chmielecki
(74) *Attorney, Agent, or Firm* — David B. Kelley; Brooks Kushman P.C.

(57) ABSTRACT

A thermal management system for an electric vehicle is provided. The thermal management system includes a thermal circuit for regulating a battery temperature. A filter is located upstream of the battery for filtering liquid coolant. The thermal management system also includes a second thermal circuit in fluid communication with the battery thermal circuit. The second thermal circuit provides thermal control to a vehicle system other than the battery. The battery thermal circuit includes a plurality of battery cells. Pluralities of heat exchanger fins are located between each of the battery cells to provide the coolant to regulate the battery temperature. The filter has a filtration transfer function based on a filter characteristic of the fins.

17 Claims, 5 Drawing Sheets

(56) References Cited

U.S. PATENT DOCUMENTS

| | | | |
|---|---|---|---|
| 2004/0157098 A1* | 8/2004 | Wexel | H01M 8/04059 429/413 |
| 2009/0142654 A1* | 6/2009 | Fakers | H01M 2/1077 429/120 |
| 2009/0176150 A1* | 7/2009 | Yanaka | B60H 1/00278 429/120 |
| 2011/0000241 A1* | 1/2011 | Favaretto | B60K 11/02 62/244 |
| 2011/0027625 A1* | 2/2011 | Payne | 429/50 |
| 2012/0094165 A1* | 4/2012 | Valencia, Jr. | H01M 10/0525 429/120 |
| 2012/0180979 A1* | 7/2012 | Harrington | F28D 1/0246 165/11.1 |
| 2012/0225341 A1* | 9/2012 | Major | B60H 1/00278 429/120 |
| 2012/0234518 A1* | 9/2012 | Brodie | B60H 1/00278 165/104.31 |
| 2012/0316712 A1* | 12/2012 | Simonini | H01M 10/625 701/22 |
| 2013/0337296 A1* | 12/2013 | Cardoso | H01M 2/12 429/61 |

* cited by examiner

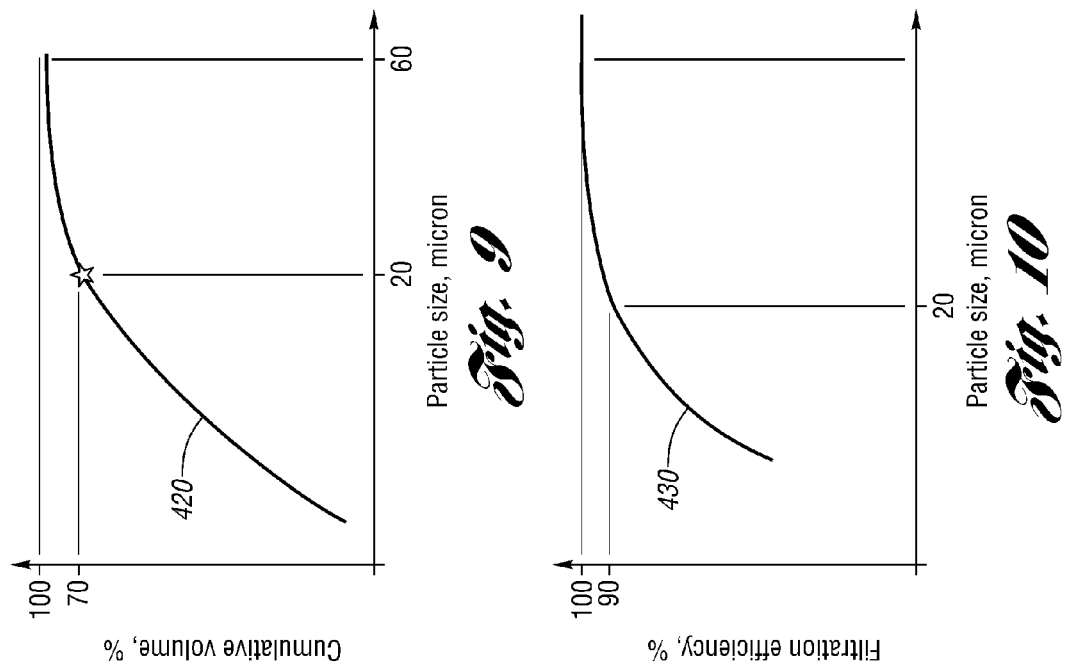
*Fig. 9*
*Fig. 10*
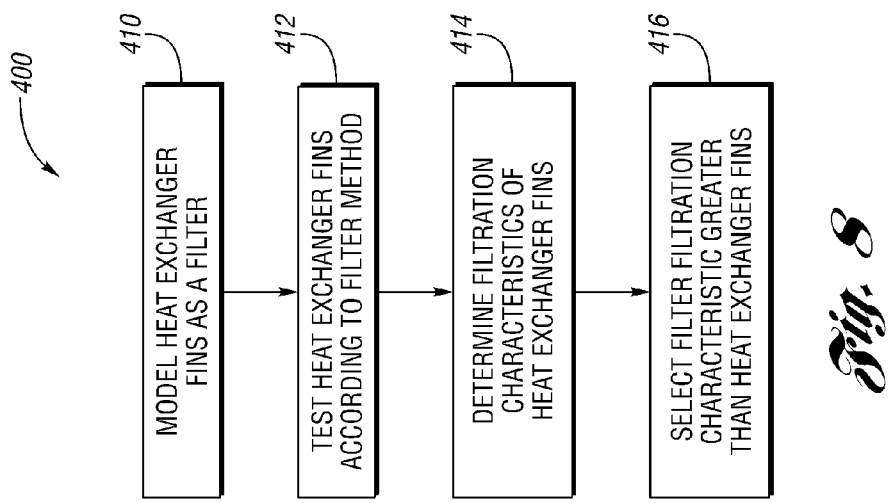
*Fig. 8*

VEHICLE THERMAL MANAGEMENT AND FILTRATION SYSTEM

TECHNICAL FIELD

The present disclosure relates to a thermal management and filtration system for a battery in an electric vehicle.

BACKGROUND

Vehicles such as battery-electric vehicles (BEVs), plug-in electric vehicles (PHEVs) or hybrid-electric vehicles (HEVs) contain a battery, such as a high voltage battery, to act as an energy source for the vehicle. Battery capacity and cycle life can change depending on the operating temperature of the battery. It is generally desirable to maintain the battery within a specified temperature range while the vehicle is operating or while the vehicle is charging.

The vehicles with batteries may include a cooling system to provide temperature control of the battery, thereby maintaining the charging capacity and extending the battery life, and improving other battery performance characteristics.

SUMMARY

In one embodiment, a thermal management system for an electric vehicle is provided. The thermal management system includes a first thermal circuit for regulating a battery temperature. A filter is located upstream of the battery in the first thermal circuit for filtering liquid coolant. The thermal management system also includes a second thermal circuit in fluid communication with the first thermal circuit. The second thermal circuit provides thermal control to a vehicle system other than the battery.

In another embodiment, the first thermal circuit includes a heat exchanger adjacent the battery for regulating the battery temperature. The heat exchanger has a restrictive flow passage.

In a further embodiment, the battery comprises a plurality of battery cells, and the heat exchanger comprises a plurality of heat exchanger fins separating each of the battery cells. The heat exchanger fins provide a liquid coolant to regulate each of the battery cell temperatures.

In yet another embodiment, the filter is a located upstream of the heat exchanger.

In another embodiment, the filter has a filtration transfer function based on a filter characteristic of the heat exchanger.

In still another embodiment, the filter transfer function comprises a filtration efficiency of 90 percent for a particle size and the heat exchanger has a filtration efficiency of 100 percent at the particle size.

In another embodiment, the first thermal circuit includes a pump. The filter is located downstream of the pump.

In a further embodiment, the thermal management system includes a third thermal circuit in thermal communication with the first and second thermal circuits, for providing thermal control to a second vehicle system other than the battery.

In another embodiment, the second thermal circuit includes an air-conditioning system adapted to regulate a passenger cabin temperature.

In one other embodiment, a battery thermal management system in an electric vehicle is provided. The battery thermal management system includes a plurality of battery cells. A plurality of heat exchanger fins are located between each of the battery cells to provide a liquid coolant to regulate the battery temperature. A filter is located upstream of the fins. The filter has a filtration transfer function based on a filter characteristic of the fins.

In another embodiment, the battery thermal management system includes a pump for circulating the liquid coolant. The filter is located downstream of a pump.

In a further embodiment, the filter is a high-pressure bypass filter.

In another embodiment, the filter transfer function comprises a filtration efficiency of 90 percent for a particle size and the heat exchanger has a filtration efficiency of 100 percent at the particle size.

In yet another embodiment, each of the heat exchanger fins has a restrictive flow passage. The filtration transfer function of the restrictive flow passages is based on evaluating the heat exchanger fins according to a filter test procedure ISO16889.

In another embodiment, the battery cells, the heat exchanger fins and the filter are located in a first thermal loop. The first thermal loop is selectively in fluid communication with a second thermal loop which provides thermal control for a vehicle system other than the battery.

In still another embodiment, the liquid coolant is one of water or glycol.

In one other embodiment, a method for regulating the temperature of a battery in an electric vehicle is provided. A heat exchanger is provided for supplying a liquid coolant to regulate the battery temperature. A filter is provided. A filtration transfer function of the filter based on a heat exchanger filtration characteristic.

In another embodiment, the filtration characteristic is a filtration efficiency (FE).

In a further embodiment, the filtration characteristic comprises a dirt holding capacity (DHC).

In yet another embodiment, the method includes evaluating a battery heat exchanger fin according to a filter test procedure to determine the filtration characteristic.

The above embodiments and other aspects of the disclosure will be better understood in view of the attached drawings and following detailed description of the illustrated embodiments.

BRIEF DESCRIPTION OF THE DRAWINGS

FIG. 8 is a flowchart illustrating a method according to an embodiment; and

FIG. 9 is a graphical illustration of a method according to an embodiment; and

FIG. 10 is a graphical illustration of a method according to an embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
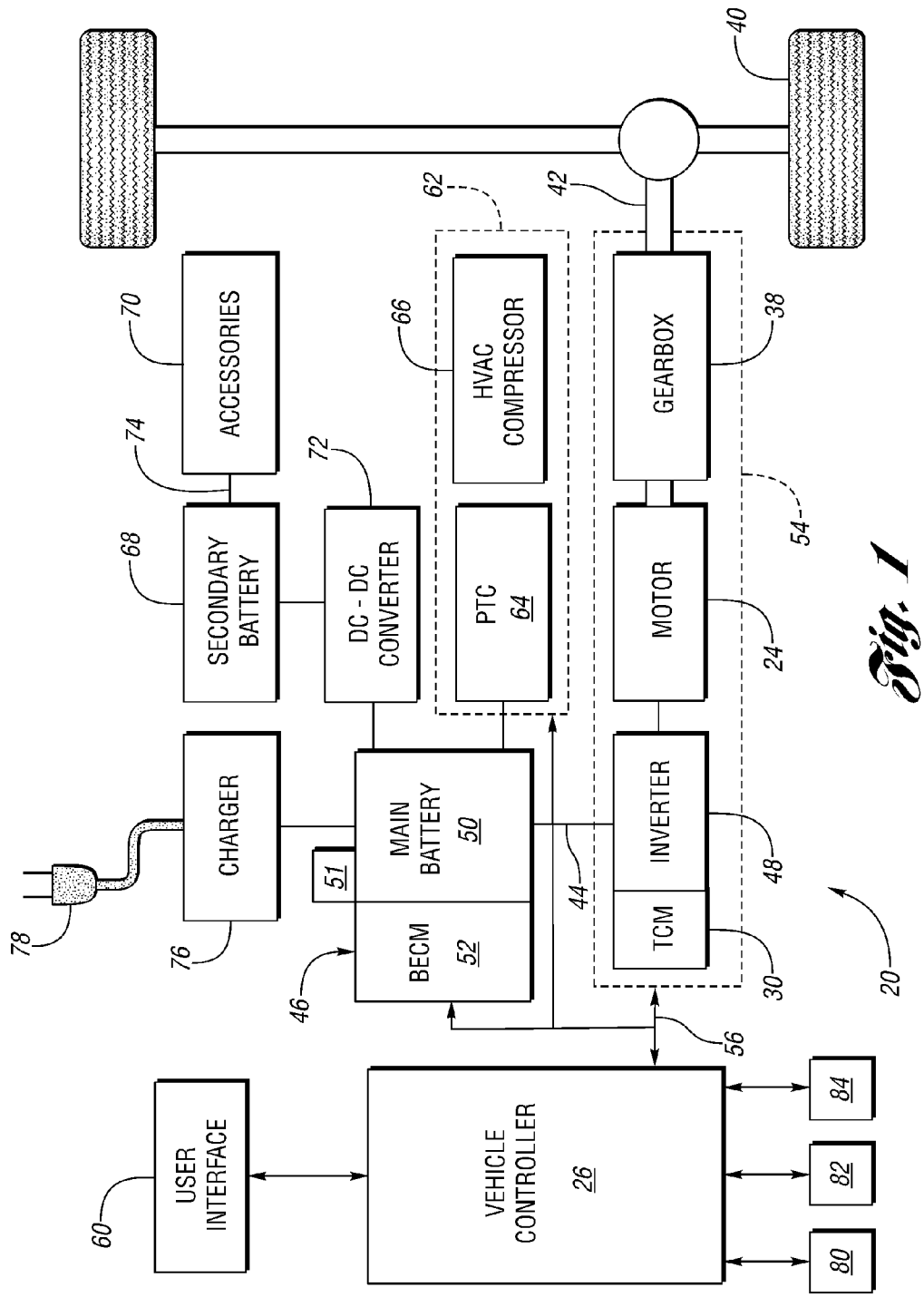
FIG. 1 is a schematic of a battery electric vehicle according to an embodiment.

With reference to FIG. 1, an electric vehicle 20, such as a battery electric vehicle (BEV), is illustrated in accordance with one or more embodiments. FIG. 1 represents only one type of BEV architecture, and is not intended to be limiting. The present disclosure may be applied to any suitable BEV.

The vehicle 20, or BEV, is an all-electric vehicle propelled through electric power, such as by an electric motor 24, and without assistance from an internal combustion engine. The motor 24 receives electrical power and provides mechanical rotational output power. The motor 24 is connected to a gearbox 38 for adjusting the output torque and speed of the motor 24 by a predetermined gear ratio. The gearbox 38 is connected to a set of drive wheels 40 by an output shaft 42. Other embodiments of the vehicle 20 include multiple motors (not shown) for propelling the vehicle 20. The motor 24 may also function as a generator for converting mechanical power into electrical power. A high voltage bus 44 electrically connects the motor 24 to an energy storage system 46 through an inverter 48.

The energy storage system 46 includes a main battery 50 and a battery energy control module (BECM) 52, according to one or more embodiments. The BECM is adapted to connect the vehicle 20 to an electrical source 78, such as, a 110V source or 220V source and to send the current received to the battery 50 or the transmission control system 30. The main battery 50 is a high voltage battery, or traction battery, that may output electrical power to operate the motor 24. The main battery 50 is a battery pack made up of one or more battery modules. Each battery module may contain one battery cell or a plurality of battery cells. The battery cells are heated and cooled using a fluid coolant system, air coolant system, or other coolant method as is known in the art. The BECM 52 acts as a controller for the main battery 50. The BECM 52 also includes an electronic monitoring system that manages temperature and state of charge of each of the battery cells. The battery 50 has at least one temperature sensor 51, such as a thermistor or the like. The sensor 51 is in communication with the BECM 52 to provide temperature data regarding the battery 50.

The motor 24, the transmission control module (TCM) 30, the gearbox 38, and the inverter 48 are collectively referred to as a transmission 54. The vehicle controller 26 communicates with the transmission 54, for coordinating the function of the transmission 54 with other vehicle systems. The controller 26, BECM 52, and TCM 30 are illustrated as separate controller modules. The control system for the vehicle 20 may include any number of controllers, and may be integrated into a single controller, or have various modules. Some or all of the controllers may be connected by a controller area network (CAN) or other system. The control system may be configured to control operation of the various components of the transmission 54 and the battery 50 under any of a number of different conditions, including in a way that thermally manages the temperature in the battery 50 and the vehicle cabin or passenger compartment, and for charging and discharging operations of the battery 50.

The TCM 30 is configured to control specific components within the transmission 54, such as the motor 24 and/or the inverter 48. The vehicle controller 26 monitors the temperature of the motor 24 and receives a throttle request (or desired motor torque request) from the driver. Using this information the vehicle controller 26 provides a motor torque request to the TCM 30. The TCM 30 and the inverter 48 convert the direct current (DC) voltage supply by the main battery 50 into signals that are used to control the motor 24 in response to the motor torque request.

The vehicle controller 26 provides information to the driver through a user interface 60. The user interface 60 may include features that permit a user to enter requirements or desired operating or charging parameters of the vehicle, or other vehicle operating parameters into the controller 26. The user interface 60 may include a touch screen interface, a wireless connection to a remote station, such as a mobile device or computer, and other input interfaces as are known in the art. The vehicle controller 26 also receives input signals that are indicative of current operating conditions of vehicle systems. For instance, the vehicle controller 26 may receive input signals from the BECM 52 that represent battery 50 conditions, and input signals from the transmission 54, that represent motor 24 and inverter 48 conditions. The vehicle controller 26 provides output to the user interface 60, such as a motor status or charge level status, which is conveyed visually to the driver. The controller 26 arbitrates between the various user requests to thermally manage the vehicle 20 both on-charge and while operating.

The vehicle 20 includes a climate control system 62 for heating and cooling various vehicle components. The climate control system 62 includes a high voltage electric heater 64 and a high voltage electric HVAC compressor 66, according to one or more embodiments. The heater 64 is used to heat coolant which circulates through the heater core and the compressor 66 is used to cool the refrigerant which cools the cabin and the battery in some situations. Both the heater 64 and the compressor 66 may draw electrical energy directly from the main battery 50. The climate control system 62 may include a controller (not shown) for communicating with the vehicle controller 26 over the CAN bus 56 or may be integrated into the controller 26. The on/off status of the climate control system 62 is communicated to the vehicle controller 26, and can be based on, for example, the status of an operator actuated switch, or the automatic control of the climate control system 62 based on related functions, such as window defrost. The climate control system 62 may be connected to the user interface 60 to permit a user to set a temperature for the cabin, or pre-program a temperature for a future operating cycle of the vehicle.

The vehicle 20 includes a secondary battery 68, such as a 12-volt battery, according to one embodiment. The secondary battery 68 may be used to power various vehicle accessories such as headlights and the like, which are collectively referred to herein as accessories 70. A DC-to-DC converter 72 may be electrically interposed disposed between the main battery 50 and the secondary battery 68. The DC-to-DC converter 72 adjusts, or "steps down" the voltage level to allow the main battery 50 to charge the secondary battery 68. A low voltage bus 74 electrically connects the DC-to-DC converter 72 to the secondary battery 68 and the accessories 70.

The vehicle 20 includes an AC charger 76 for charging the main battery 50. An electrical connector 78 connects the AC charger 76 to an external power supply (not shown) for receiving AC power. The AC charger 76 includes power electronics used to convert, or "rectify" the AC power received from the external power supply to DC power for charging the main battery 50. The AC charger 76 is configured to accommodate one or more conventional voltage sources from the external power supply (e.g., 110 volt, 220 volt, etc.) In one or more embodiments, the external power supply includes a device that harnesses renewable energy, such as a photovoltaic (PV) solar panel, or a wind turbine (not shown).

Also shown in FIG. 1 are simplified schematic representations of a driver controls system 80, a power steering system 82, and a navigation system 84. The driver controls system 80 includes braking, acceleration and gear selection (shifting) systems. The braking system includes a brake pedal, position sensors, pressure sensors, or some combination thereof, as well as a mechanical connection to the vehicle wheels, such as the primary drive wheels 40, to effect friction braking. The braking system may also be configured for regenerative braking, wherein braking energy may be captured and stored as electrical energy in the main battery 50. The acceleration system includes an accelerator pedal having one or more sensors, which, like the sensors in the braking system, provides information such as the throttle request to the vehicle controller 26. The gear selection system includes a shifter for manually selecting a gear setting of the gearbox 38. The gear selection system may include a shift position sensor for providing shifter selection information (e.g. park, drive, neutral) to the vehicle controller 26.

The navigation system 84 may include a navigation display, a global positioning system (GPS) unit, a navigation controller and inputs (all not shown) for receiving destination information or other data from a driver. The navigation system may be integrated with the user interface 60 in some embodiments. The navigation system 84 may also communicate distance and/or location information associated with the vehicle 20, its target destinations, or other relevant GPS waypoints.

Figure 2:
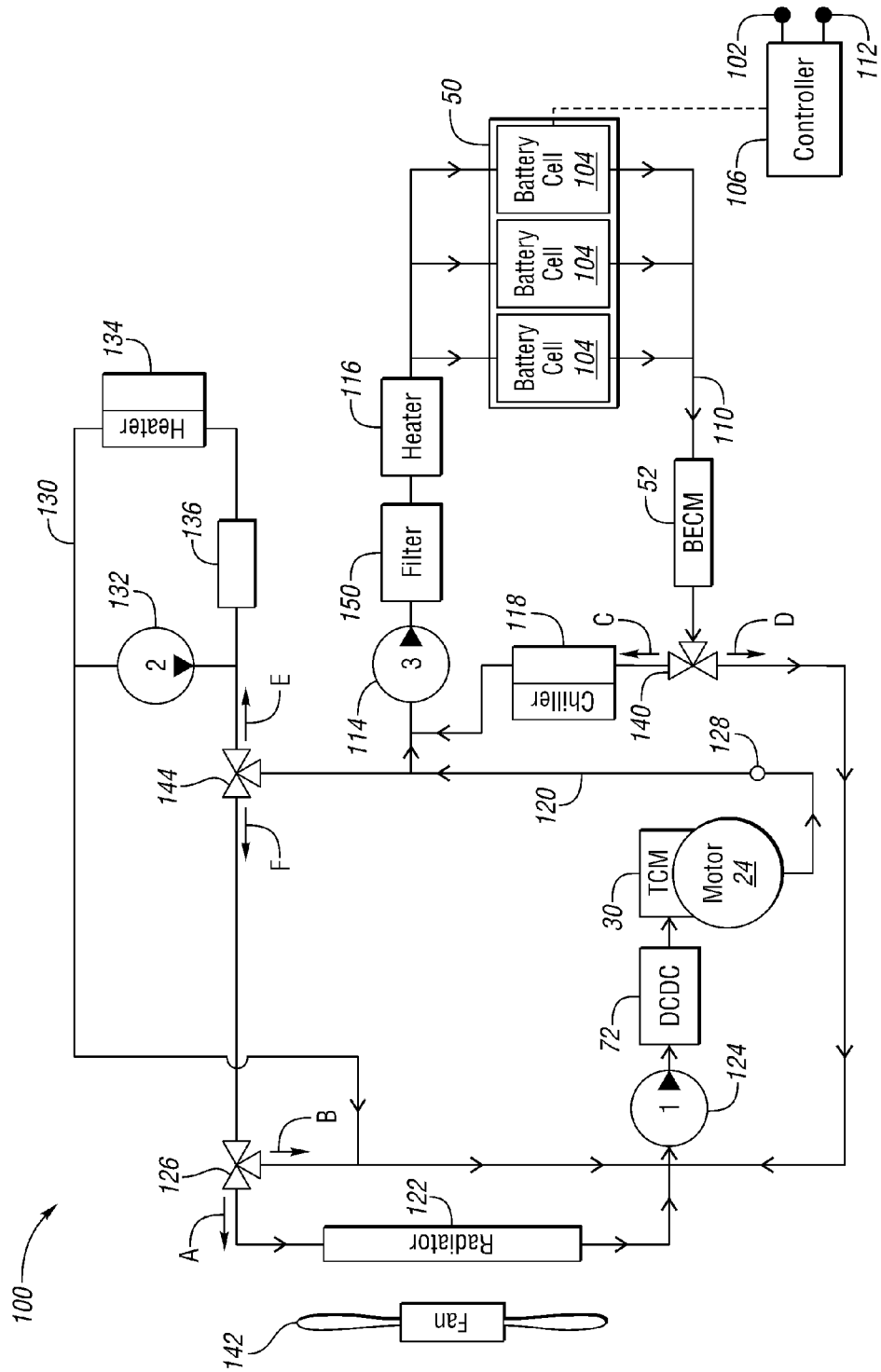
FIG. 2 is a schematic of a battery thermal management system according to an embodiment.

FIG. 2 illustrates a plurality of integrated thermal circuits or loops which form a thermal management system 100 for use with vehicle 20 as shown in FIG. 1. The thermal management system 100 includes a battery thermal loop 110, a motor loop 120, and an cabin loop 130.

The battery thermal loop 110 may heat and cool the battery 50. The battery 50 is made up of one or more battery packs, and a battery 50 having one pack is shown in FIG. 2. Each battery pack may have multiple cells. The battery 50 in FIG. 2 is illustrated having three cells 104, although any number of cells may be used with a battery 50 as is known in the art. The battery cells 104 are separated by heat exchanger fins, shown in more detail in FIG. 5, which are used to regulate the temperature of each of the battery cells 104.

The controller 106, which may be a vehicle controller in communication with or integrated with the battery control module, monitors the battery 50 to determine the state of charge and capacity of the battery 50. Each cell 104 may have an associated temperature sensor that is configured to measure the cell temperature. The temperature sensor is in communication with the controller 106 such that the controller 106 also monitors the battery temperature by monitoring each batter cell 104 temperature. The controller 106 determines the temperature of the battery 50 by measuring or estimating the temperatures of the various battery cells 104.

The controller 106 is also in communication with an ambient temperature sensor 102 on the vehicle. The ambient temperature sensor 102 is configured to measure the temperature of the ambient environment. A cabin temperature sensor 112 is also in communication with the controller 106 and measures the temperature of the vehicle passenger cabin to provide feedback for the HVAC system for climate control of the cabin.

The battery 50 temperature may be actively regulated using the battery thermal loop 110 that is controlled by controller 106. The temperature of the battery 50 and of each cell 104 determines the amount of charge that the battery 50 can accept and the amount of charge that can be used when stored in the battery 50.

The battery thermal loop 110 thermally manages the battery 50 to regulate cell 104 temperatures in order to maintain the battery 50 useful life, permit a proper charge, and meet vehicle performance attributes. The battery thermal loop 110 provides active heating or active cooling to the battery cells 104 via liquid heat transfer in heat exchanger fins 300 (FIG. 5) of each of the cells 104. The battery thermal loop 110 may be integrated into a vehicle thermal system having both climate control heating and cooling elements and powertrain cooling elements.

The battery thermal loop 110 contains a fluid that cycles through cooling channels in the heat exchanger fins 300 adjacent to the cells 104 in the battery to heat or cool the battery 50 using primarily convective heat transfer. The fluid is a liquid coolant, such as glycol or water, that aids in regulating the temperature of the battery cells 104. A pump 114 controls the flow of the fluid in the battery thermal loop 110. A heating element 116 acts as a thermal source for the fluid to heat the fluid and in turn to actively heat the battery 50. The heating element 116 may be a heat exchanger with another thermal system in the vehicle to recover waste heat, or may be a stand-alone heater, such as an electrically powered heater including a positive thermal coefficient (PTC) heater.

The battery thermal loop 110 also has a chiller element 118, or thermal sink, that cools the fluid and which in turn actively cools the battery 50. The chiller element 118 may be part of a vapor compression or absorption cycle, a heat exchanger with another element in the vehicle thermal systems, or other thermal sink as is known in the art. Heat exchangers in the chiller element 118 may be co-flow, counterflow or other heat exchangers as are known in the art to appropriately heat or cool the fluid in the battery thermal loop 110.

The battery thermal loop 110 also includes the BECM 52. The BECM 52 may also generate heat during use may also require cooling to maintain the BECM 52 within a suitable temperature range. The battery thermal loop 110 may also flow through the battery charger to actively heat or cool the BECM 52 and charging components. A battery valve 140 is provided to selectively couple the battery thermal loop 110 and the motor loop 120.

The motor loop 120 cools the traction motor 24, the transmission control system 30 and the DC/DC converter 72. The motor loop 120 also includes a radiator 122, and a motor loop pump 124 positioned to pump heat exchange fluid through the motor loop 120. The motor loop pump 124 may be located in an acceptable position along the motor loop 120.

When the radiator bypass valve 126 is in the first position, all of the heat exchange fluid flow is directed in the direction A and through the radiator 122. Conversely, when the radiator bypass valve 126 is in the second position, all of the heat exchange fluid flow is directed in the direction B. In the direction B, the fluid bypasses the radiator 122 when possible, such as when the heat exchange fluid is below a threshold temperature. In the direction B, bypassing the radiator 122 reduces the pressure drop across the radiator 122. The higher pressure fluid reduces the amount of work required by the pump 124 which reduces the energy consumption. By reducing energy consumption of the vehicle, fuel efficiency is increased and/or the electric range of the vehicle by the battery 50 is extended.

A temperature sensor 128 may be provided for determining the temperature of heat exchange fluid at a selected point in the motor loop 120. As illustrated, the temperature sensor 128 may be positioned downstream from all the thermal loads such as the motor 24, the TCM 30 and the DC/DC converter 72 in order to record the highest temperature of the heat exchange fluid. Based on the temperature determined by the temperature sensor 128, a controller, such as controller 106, can determine whether or not to position the radiator bypass valve 126 in the first position where flow is directed in the direction A the radiator 122, or in the second position when fluid flow bypasses the radiator 122 in the direction B.

The cabin loop 130, includes the HVAC system for the vehicle, or climate control system for the vehicle passenger cabin, is illustrated. The cabin loop 130 has a fluid loop with a pump 132, a chiller element 134 to provide cooled fluid to the HVAC an system to provide cool air to the cabin vents.

The cabin loop 130 may also include a heater 136, such as a PTC heater, that provides warm air to the passenger cabin. The cabin loop 130 may have a return loop to reheat cabin air, and may also have a fresh air intake to add additional outside air to the cabin.

An cabin loop valve 144 is provided for selectively providing heat exchanger fluid to the cabin loop. In a first position the cabin loop valve 144 directs fluid flow in the direction E towards the cabin loop 130 and the heater core element 134. In the second position, the cabin loop valve 144 is positioned in to direct flow in the direction F towards the motor loop 120 to isolate the cabin loop 130. The cabin loop valve 144 allows the cabin loop 130 to be turned off to conserve energy when the temperature is such that cabin heating and/or cooling are not required.

The battery thermal loop 110, the motor loop 120 and the cabin loop 130, are three separate but integrated thermal loops. The loops 110, 120 and 130 can close three separate valves and run independently from each other using three separate pumps. Or the loops 110, 120 and 130 may be selectively blended so that waste heat from the motor 24 can be used to heat the cabin or heat the battery 50, for example. The multiple integrated thermal loop architecture minimizes the necessary components in each of the loops 110, 120 and 130 if each loop were separate which allows for cost and weight savings, for example.

The filter 150 may also be integrated in a thermal management system with multiple integrated thermo loops having a different configuration. For example, the filter may be disposed in a thermal management system where a battery loop and a motor loop are arranged in parallel, such as in U.S. patent application Ser. No. 13/757,291, filed on Feb. 1, 2013, the disclosure of which is hereby incorporated by reference.

However, a disadvantage of the multiple integrated thermal loop architecture is that debris from one loop can potentially contaminate another loop. In particular, debris and contamination introduced into the battery thermal loop 110 could be a large problem in the very narrow cooling channels of the heat exchanger fins 300. Debris and contamination may be present in the motor loop 120 or the cabin loop 130 from manufacturing and assembly processes or even from wear of components.

To protect the battery cells 104 from contamination in the thermal system 100, the battery thermal loop 110 also includes a filter 150. The filter 150 is disposed upstream of the battery 50 in order to filter debris from the battery thermal loop 110 as well as debris from the motor loop 120 or the air-conditioning loop 130 before the debris gets to the narrow cooling channels 310 in the heat exchanger fins 300.

Figure 3:
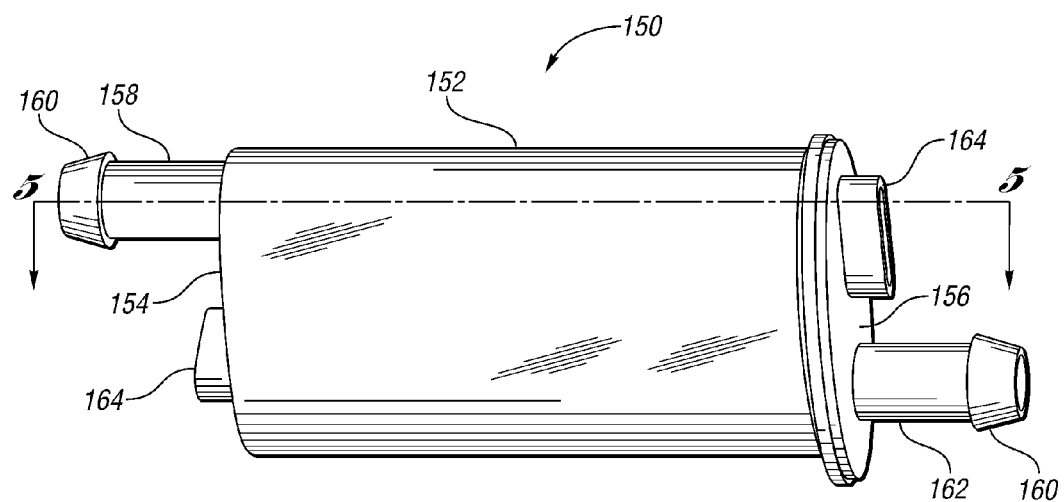
FIG. 3 is a perspective view of a filter according to an embodiment.

As illustrated in FIG. 3, the filter 150 is a bypass filter. The filter includes a filter housing 152. The filter housing may be injection molded of plastic or a metal canister, or any other suitable material. The filter 150 also includes an inlet cover 154 and an on outlet cover 156. The inlet cover 154 has an inlet port 158. The inlet port 158 may include a barbed opening 160 for connecting to the battery thermal loop 110. It is also contemplated that the inlet port 158 may have a threaded opening, quick connect or any other suitable opening for connecting to the battery thermal loop 110. Likewise, the outlet cover 156 has an outlet port 162. In one embodiment the inlet cover 154 and outlet cover 156 are sonically welded to the housing 152. The inlet cover 154 and outlet cover 156 may be secured to the housing 152 by any suitable means such as crimping or welding, for example. The inlet cover 154 and outlet cover 156 may also include attachment features 164 which are adapted to receive fasteners or be mounted to a component.

Figure 4:
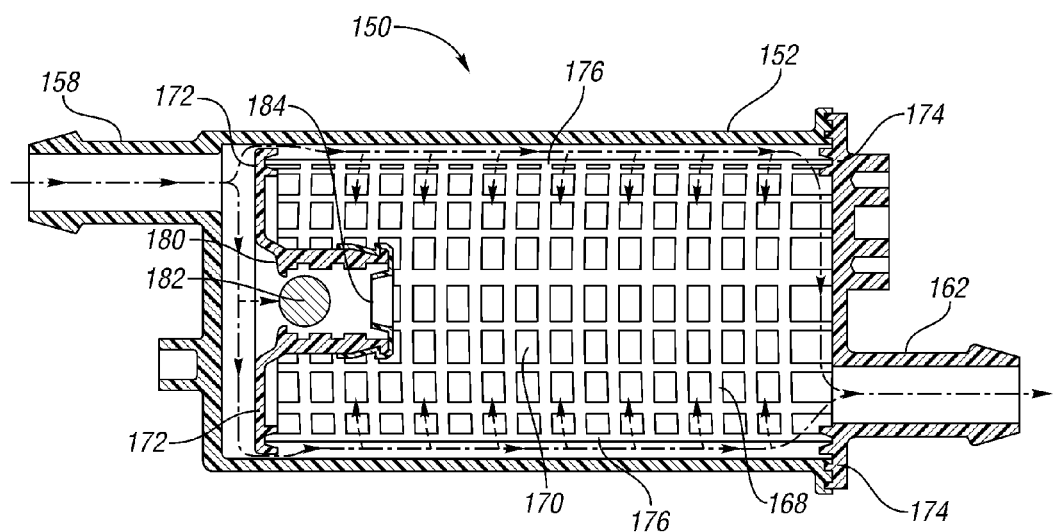
FIG. 4 is a cross-section view of filter according to an embodiment.

FIG. 4 is a cross-section view through line 4-4 of FIG. 3. The cross section view illustrates the center tube 168 and the filtration media sleeve 170 inside the filter housing 152. The center tube 168 is a cylindrical meshed support structure over which the filtration media 170 is secured. The center tube 168 and filtration media 170 include a seal 172 at a first end and a seal 174 at the second longitudinal end. Liquid coolant enters the inlet port 158 and can flow around the lateral sides 176 of the filtration media 170 where fluid passes through the filtration media 170 and then exits the outlet port 162. The filtration media 170 captures any debris along the lateral sides 176 thereby preventing the debris from exiting the outlet port 162.

The filter 150 also includes a pressure relief valve 180. The pressure relief valve includes a ball 182 and spring 184. If the filtration media sleeve 170 becomes too clogged with debris, fluid flow through the filter 150 may be restricted and they system pressure may increase. In this situation, the system pressure on the ball 182 compresses the spring 184 allowing fluid flow to bypass the media sleeve 170. The bypass valve 180 may only be activated in emergency, high contamination situations.

Figure 5:
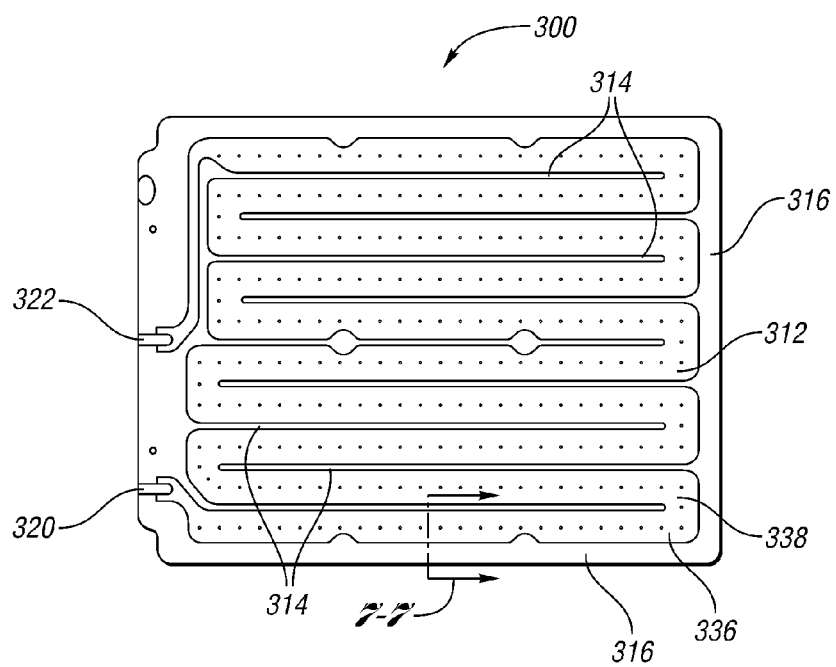
FIG. 5 is a perspective view of a portion of a heat exchanger according to an embodiment.
Figure 6:
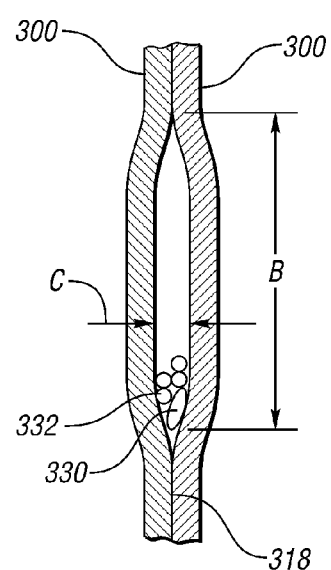
FIG. 6 is a cross-section view of a heat exchanger according to an embodiment.

FIG. 5 illustrates a heat exchanger fin 300 having cooling channels 310. Cooling paths 312 are formed in sheets of aluminum. At least two heat exchanger fins 300 are brazed together so they form cooling channels 310 when adjacent paths 312 are aligned, as shown in the cross-section view in FIG. 6. The cooling paths 312 may be formed as a depression in a serpentine pattern along the otherwise generally planar surface of the heat exchanger fins 300. Landings 314 are formed between the paths 312. An outer flange 316 extends around the periphery of the heat exchanger fins 300. The landings 314 and outer flanges 316 are generally coplanar so that when two adjacent fins are brazed together, the landings 314 and outer flanges align with corresponding features on the adjacent heat exchanger fin 300 and form a braze or solder joint 318.

The resulting cooling channels 310 formed between two heat exchanger fins 300 are torturous passages that have a width B which may be approximately 10 to 15 millimeters wide. The distance C of the cooling channels 310 is the distance between the heat exchanger fins and may be less than 0.8 millimeters.

The heat exchanger fins 300 may be positioned vertically that so fluid passing through passages travels from a bottom inlet 320 to a top outlet 322 of each heat exchanger fin 300. This type of fluid passage geometry, while optimized for heat exchange purposes by maximizing surface area of the heat exchanger surface, is very sensitive to contamination by debris. Low flow rate of the coolant inside of passages results in low coolant velocity and laminar flow conditions (e.g. Reynolds number <70) that preclude flushing contamination and debris from cooling channels 310 under normal operating conditions. As a result. The heat exchanger fins 300 and cooling channels 310 formed therein act similar to individual filtration elements.

Figure 7:
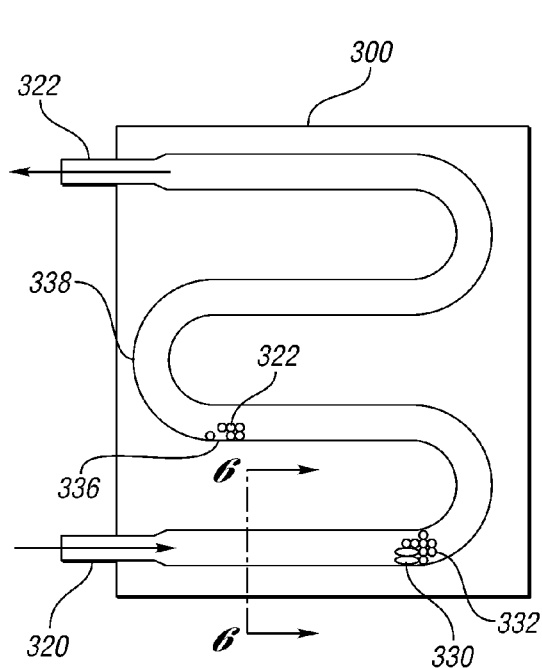
FIG. 7 embodiment is a simplified plan view of a portion of a heat exchanger according to an embodiment.

As shown in a simplified view of the cooling channels in FIG. 7, laminar fluid flow in the cooling channels 310 results in mechanical retention of larger debris 330. The larger debris 330 may be larger than the distance C, and in this illustration, larger than 0.8 millimeter. The fluid flow in the cooling channels 310 also encourages gravity silting where gravitational separation of fine solids 332 suspended in the coolant becomes settles as debris at a bottom portion 336 of the vertical channels 338 under gravitational force.

The filter 150 is used to assure cleanliness of the fluid coolant and the cooling channels 310 of the heat exchanger fins 300. The filter 150 is characterized by a filtration efficiency (FE) or "beta ratio" according to international standards (ISO). The FE, or beta ratio, is a relationship between the number of particles larger than an indicated size upstream of the filter 150 and downstream of the filter 150 using standard contaminant and particle counting systems. The filter 150 may also be characterized by dirt holding capacity (DHC). The DHC is defined as the weight of contaminants that could be absorbed by the filtration media 170 on to the filter reaches a predetermined terminal differential pressure.

International standard ISO 16889 is a multi-pass method for evaluating filtration performance of a filter on element and is most commonly used for measuring filtration performance including filtration efficiency and dirt holding capacity of filters.

The FE and DHC of filtration media are factors that help determine the surface area of filtration media. The surface area of filtration media impacts the filter assembly external size, weight and cost of the filter. In general, filters with high FE and DHC are required to be larger sized due to the lower fluid permeability (i.e. high flow resistance) of higher efficiency filtration media.

Heat exchangers fins 300 used in BEV's present new challenges due to the extremely narrow cooling channels 310 which are very susceptible to contamination and debris and act as a filter themselves. The cooling channels 310 are designed to operate at very low flow rates to provide maximum convective cooling to the battery cells 104. In addition, the liquid coolant may be water or glycol coolant, or a mixture thereof, which can cause oxidation resulting in generation of additional debris. Therefore, a unique filter and unique method of specifying a filter is required upstream of the heat exchanger fins.

Typically, an empirical approach is used for selecting a filter with a FE and DHC that provides sufficient protection for the heat exchanger fins 300. The empirical approach could result in excessive or insufficient filtration. In case of excessive filtration, a very dense or high filtration efficiency filtration media is used resulting in a filter that provides excessive protection against contaminants, but in the same time presents an addition resistance to hydraulic coolant flow that would result in additional power draw of an electrically driven coolant pump. If filtration media is too coarse or inefficient, it may allow large debris downstream of filter that could result in blockage of cooling channels.

In order to determine the requirements of the filter 150 in selecting a filter providing sufficient FE and DHC to protect the heat exchanger fins 300 from debris, a new filter selection method 400 was developed, as shown in FIG. 8. The heat exchanger fins 300 are evaluated as a lower efficiency functional filter located downstream of the higher efficiency primary filter 150, as represented by block 410. The heat exchanger fins 300 were evaluated using the test setup described in ISO 16889 multi-pass efficiency method, as represented by block 412. Pressure is maintained constant while the flow rate could vary depending on the heat exchanger dirt loading condition. The test is run for at least two hours until the flow rate is reduced by 20%.

Based on the test, a filtration characteristic of the heat exchanger fins is determined, as represented by block 414. For example, a "percent retained" of contamination in the cooling channels 310 is calculated according to the guidelines of ISO 16889. According to an example shown in FIG. 10, 30% of standard contamination dust per weight was retained inside the cooling channels 310, meaning that 70% of the contamination remained in suspension.

Assuming that larger size particles are retained in the cooling channels 310 and using standard dust weight versus particle size cumulative distribution properties, the maximum particle size that corresponds to 30% of the distribution is determined. Then the filtration characteristics of the filter 150 are selected so that it is greater than the filtration characteristics of the heat exchanger fins 300, as represented by block 416. The FE of the filter 150 may be selected according to ISO 16889 so that at least 90% of a particle size larger than a corresponding particle size found on a cumulative size and weight distribution of ISO 16889 at a percent volume point equal or smaller than the calculated 90% "percent retained".

FIG. 9 illustrates a method of selecting the filtration characteristics of the filter 150 media based on the filtration characterization curve of the heat exchanger fin at different particle sizes. The filtration characteristic curve is generated using a standard testing procedure, such as ISO 16889. Cumulative volume as a percentage of contaminants is shown on the y-axis. Particle size is shown along the x-axis, measured in microns.

FIG. 9 illustrates the filtration characteristics when contamination dust of a known volume and particle sizes is introduced into the heat exchanger fins. The contamination dust that passes through the heat exchanger fins is collected an analyzed based on the percentage of contaminants that pass through the heat exchanger fins, for each of the particle sizes. For example, as illustrated in FIG. 9 a known quantity of 20 micro particles are introduced into the heat exchanger, and only 70% pass through the heat exchanger fins. Therefore, 30% of the contaminants of the 20 micron size are trapped in the heat exchanger fin cooling channels. The filtration characteristic curve 420 is obtained empirically. The filtration characteristic curve 420 may be used to obtain the transfer function of the filter 150.

FIG. 10 is a illustrating a method of selecting filtration media based on the filtration characterization curve of the heat exchanger fin at different particle sizes. Filtration efficiency (FE) for an indicated particle size is shown on the y-axis. Particle size is shown along the x-axis, measured in microns. FIG. 10 shows that filtration test results (per ISO 16889) that demonstrate 90% of filtration efficiency for particle sizes larger than 20 micron. The filtration efficiency (FE) represents the number of particles larger than the indicated particle size upstream of filter minus number of particles larger than the indicated size downstream of filter divided by the number of particles larger than indicated particle size upstream of filter represented by the equation:

$$FE_{D\ Particle\ Size} = (D_{Particles\_Upstream} - D_{Particles\_Downstream})/D_{Particles\_Upstream} \times 100$$

The filtration characteristic curve 430 may be used to obtain the transfer function of the filter 150. Based on the filtration characteristic curves 420, 430 shown in graphs of FIG. 9 and FIG. 10, there may be many options for selecting filtration media suitable for the filtration requirement as long a minimum FE requirement is met, such as the example of 90% efficiency at 20 micron particle size. Typically media selection process is finalized by identifying a media type that has a minimum flow resistant per unit area that meets the above criteria.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle thermal management system comprising:
   a first thermal circuit for regulating a battery temperature;
   a filter located upstream of the battery in the first thermal circuit for filtering liquid coolant; and
   a second thermal circuit in fluid communication with the first thermal circuit for providing thermal control to at least one of a traction-motor system and a passenger cabin,
   wherein the first thermal circuit includes a heat exchanger having a restrictive flow passage adjacent the battery for regulating the battery temperature,
   wherein the filter has a filtration transfer function based on a filter characteristic of the heat exchanger.

2. The thermal management system according to claim 1 wherein the filter is located upstream of the heat exchanger.

3. The thermal management system of claim 1 wherein the filtration transfer function comprises a filtration efficiency of 90 percent for a particle size and the heat exchanger has a filtration efficiency of 100 percent at the particle size.

4. The thermal management system according to claim 1 wherein the first thermal circuit includes a pump, the filter located downstream of the pump.

5. The thermal management system according to claim 1 further comprising a third thermal circuit in thermal communication with the first and second thermal circuits for providing thermal control to a second vehicle system other than the battery.

6. The thermal management system according to claim 1, wherein the heat exchanger includes a plurality of heat exchanger fins, wherein one of the plurality of heat exchanger fins is disposed between each of a plurality of battery cells for providing a liquid coolant to regulate the battery temperature wherein the filtration transfer function is based on a filter characteristic of the fins.

7. The thermal management system according to claim 4 wherein the filter is a high-pressure bypass filter.

8. A vehicle thermal management system comprising:
   a first circuit having a heat exchanger for thermally regulating a battery temperature;
   a second circuit in fluid communication with the first circuit for thermally regulating a vehicle system other than the battery; and
   a filter located upstream of the battery in the first circuit for filtering liquid coolant,
   wherein the filter has a filtration transfer function based on a filter characteristic of the heat exchanger.

9. The thermal management system according to claim 8 wherein the first circuit includes a heat exchanger having a restrictive flow passage adjacent the battery for regulating the battery temperature.

10. The thermal management system of claim 8 wherein the filtration transfer function comprises a filtration efficiency of 90 percent for a particle size and the heat exchanger has a filtration efficiency of 100 percent at the particle size.

11. The thermal management system according to claim 8 further comprising a third circuit in fluid communication with the first and second circuits for thermally regulating at least one of a electric-motor system and a passenger cabin.

12. The thermal management system according to claim 8, wherein the heat exchanger includes a plurality of heat exchanger fins, wherein one of the plurality of heat exchanger fins is disposed between each of a plurality of battery cells for providing a liquid coolant to regulate the battery temperature wherein the filtration transfer function is based on a filter characteristic of a restrictive flow passage in one of the fins.

13. The thermal management system according to claim 8 wherein the filter is located upstream of the heat exchanger.

14. A vehicle thermal management system comprising:
   a first circuit for thermally regulating a battery temperature;
   a second circuit in fluid communication with the first circuit for thermally regulating an electric traction-motor system; and
   a filter located upstream of the battery in the first circuit for filtering liquid coolant,
   wherein the first circuit includes a heat exchanger and the filter has a filtration transfer function based on a filter characteristic of the heat exchanger.

15. The thermal management system according to claim 14, wherein the heat exchanger includes a plurality of heat exchanger fins, wherein one of the plurality of heat exchanger fins is disposed between each of a plurality of battery cells for providing a liquid coolant to regulate the battery temperature and wherein the filtration transfer function is based on a filter characteristic of a restrictive flow passage in one of the fins.

16. The thermal management system according to claim 14 wherein the filter is located upstream of the heat exchanger.

17. The thermal management system according to claim 14 further comprising a third circuit in fluid communication with the first and second circuits for thermally regulating a passenger-cabin.

* * * * *